United States Patent
Wanser

[19]

[11] Patent Number: 5,848,204
[45] Date of Patent: Dec. 8, 1998

[54] FIBER DEVICES AND SENSORS BASED ON MULTIMODE FIBER BRAGG GRATINGS

[75] Inventor: Keith H. Wanser, Mission Viejo, Calif.

[73] Assignee: California State University-Fullerton, Fullerton, Calif.

[21] Appl. No.: 525,967

[22] Filed: Sep. 8, 1995

[51] Int. Cl.$^6$ .................................................. G02B 6/00
[52] U.S. Cl. ............................................. 385/12; 385/13
[58] Field of Search ......................................... 385/12, 13

[56] References Cited

U.S. PATENT DOCUMENTS

| 4,268,116 | 5/1981 | Schmadel et al. . | |
|---|---|---|---|
| 4,400,056 | 8/1983 | Cielo . | |
| 4,806,012 | 2/1989 | Meltz et al. . | |
| 4,807,950 | 2/1989 | Glenn et al. . | |
| 4,815,843 | 3/1989 | Tiefenthaler et al. | 385/12 |
| 4,911,516 | 3/1990 | Palfrey et al. . | |
| 4,920,261 | 4/1990 | Bock et al. | 385/12 |
| 5,187,760 | 2/1993 | Huber . | |
| 5,206,924 | 4/1993 | Kersey | 385/12 |
| 5,218,651 | 6/1993 | Faco et al. . | |
| 5,280,172 | 1/1994 | Di Bin et al. . | |
| 5,290,103 | 3/1994 | Fevrier et al. | 385/12 |
| 5,305,335 | 4/1994 | Ball et al. . | |
| 5,307,437 | 4/1994 | Facq et al. . | |
| 5,532,864 | 7/1996 | Alexander et al. | 385/12 |
| 5,563,967 | 10/1996 | Haake | 385/13 |
| 5,564,832 | 10/1996 | Ball et al. | 385/12 |

*Primary Examiner*—Rodney B. Bovernick
*Assistant Examiner*—Robert E. Wise
*Attorney, Agent, or Firm*—Leonard Tachner

[57] ABSTRACT

New sensing and diagnostic methods are implemented with multimode fiber Bragg gratings (MMFBG) and methods for sensor addressing and multiplexing are described. Real time structural strain and vibration monitoring using optical time domain reflectometry (OTDR) is discussed. The first all-mode, wave optics calculations of the reflectivity of Bragg gratings in highly multimode optical fibers are presented, including the effects of individual mode power changes due to microbending transducer loss upstream from the grating. Two categories of multimode fiber gratings are possible, independent mode and mode coupling, and the fabrication differences between these types of gratings are described. The reflectivity properties of independent mode multimode fiber gratings are examined and compared to single mode fiber gratings. In particular, multimode fiber gratings offer added flexibility in grating design and performance characteristics compared to single mode fiber gratings, because the reflectivity response may be tuned by the spatial periodicity, length, core size, numerical aperture, and mode coupling characteristics of the grating.

13 Claims, 10 Drawing Sheets

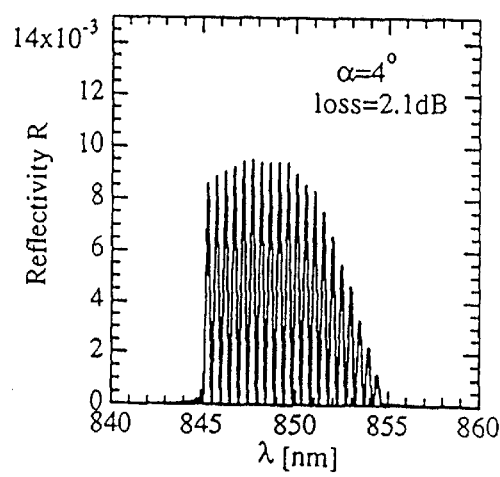
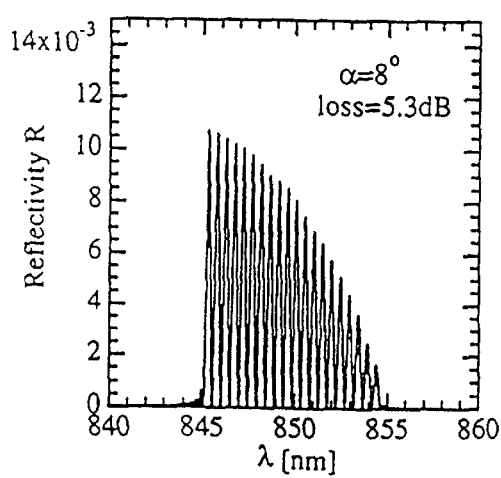
FIG. 2e  FIG. 2f

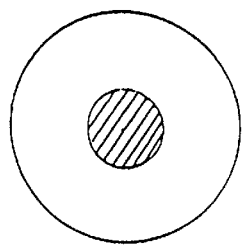 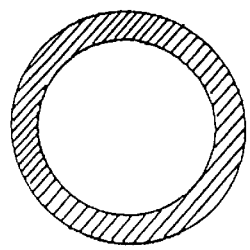 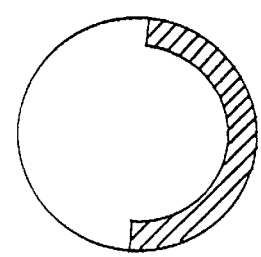
FIG. 8a    FIG. 8b    FIG. 8c
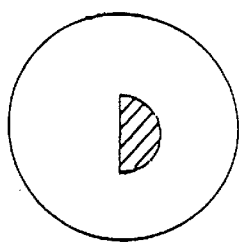 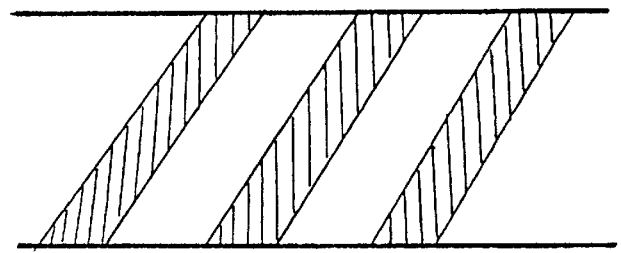
FIG. 8d    FIG. 9a
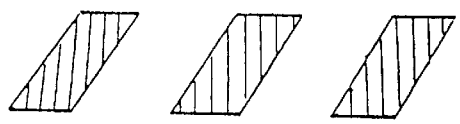
FIG. 9b
FIG. 9c

FIBER DEVICES AND SENSORS BASED ON MULTIMODE FIBER BRAGG GRATINGS

BACKGROUND OF THE INVENTION

FIELD OF THE INVENTION

The present invention relates to optical fiber devices and sensors and specifically to the use of multimode fiber Bragg gratings therein. Refractive index gratings written in single mode optical fibers are becoming popular for use as strain sensors in structural monitoring applications (see references 1–6). There have been numerous studies of Bragg reflection gratings in single mode fibers (see references 7–14), and a few studies on Bragg gratings for use as mode converters in two and few mode fibers (see references 15–20). There have been no published reports of work on reflection mode Bragg gratings in highly multimode optical fibers. In this disclosure applicant develops the all mode wave optics theory for the reflectivity of Bragg gratings written in highly multimode optical fiber. The motivation for developing this theory comes from the possibility of employing large core multimode optical fibers for real time structural monitoring applications using optical reflectometry techniques. In order to reflectively monitor change in measurands occurring at up to kilohertz rates, it is necessary to develop reflectometry techniques that are not based on the extremely weak Rayleigh backscatter, such as is commonly used in microbend sensor transducers interrogated by OTDR (see reference 21). The simplest approach to this problem is to enhance the reflection returns associated with the sensing transducer. Although approaches to this problem have been proposed employing reflectors external to fiber (see reference 22), as yet there is no practical method suitable for mass production. On the other hand, Bragg gratings written by UV laser light offer the attractive possibility of reasonable manufacturability (see references 8–14). Such gratings in large core diameter multimode fiber are desirable, since the large launched power available with low cost light sources offers an attraction unobtainable with single mode fibers for distributed sensing networks. An important difference between highly multimode fiber gratings and single mode gratings is the broader reflection bandwidth associated with the numerous modes. This broader reflection bandwidth allows use of a greater portion of the spectrum of the incident light in the case of broadband interrogation, and relaxes the tolerances on source wavelength selection in the case of narrowband sensor interrogation. Furthermore, the mode population of the fiber can be sensed locally, thus allowing new types of modal domain sensors to be employed. In addition, the larger numerical aperture of commercially available multimode fibers suggests a more rapid grating fabrication time than in the case of lower numerical aperture single mode fibers, due to larger germanium dopant concentrations.

PRIOR ART

The following is a list of U.S. Patents that were received from a patentability search that was conducted in the U.S. Patent and Trademark Office.

U.S. Pat. No. 4,268,116 Schmadel et al
U.S. Pat. No. 4,400,056 Cielo
U.S. Pat. No. 4,806,012 Meltz et al
U.S. Pat. No. 4,807,950 Glenn et al
U.S. Pat. No. 4,911,516 Palfrey et al
U.S. Pat. No. 5,187,760 Huber
U.S. Pat. No. 5,218,651 Faco et al
U.S. Pat. No. 5,280,172 Di Bin et al
U.S. Pat. No. 5,305,335 Ball et al
U.S. Pat. No. 5,307,437 Facq et al Of the foregoing patents, the following appear to be more relevant:

U.S. Pat. No. 5,218,651 to Faco et al is directed to an optical fiber incorporating a variable internal Bragg grating and its applications. This is a temporary grating produced and maintained by application of external beams. Removal of external beams makes the grating go away. As shown in the Figures, the component of the invention includes an optical fiber 1 having a core 2 and a sheath 3. The core is composed of an amplifying material. In operation, a luminous flux 6 coupled to the optical fiber 1 encounters periodic variations of refractive index which constitute a Bragg lattice 7. This Bragg lattice 7 acts on the flux 6, reflecting a part of the latter when the strata making up the Bragg lattice are perpendicular to the axis of the fiber, producing the extraction, out of the core of the fiber, of a part of this flux 6 when the strata are inclined in relation to the axis of the fiber 1. The process outlined in this invention for the formation of Bragg lattices can be applied to both monomode fibers and multimode fibers. This fiber may be used as an element in a deflector, polarizer, coupler, or a sensor. However, there is no discussion of the multimode aspects or of mode population transfer.

U.S. Pat. No. 4,911,516 to Palfrey et al is directed to an optical device with mode selecting grating. As shown in FIGS. 1 and 2, system 10 includes a laser semi-conductor diode 12 butt coupled to an optical fiber 14. The diode emits a beam from its active region 16, which beam normally without fiber 14 has multimodes. The optical fiber 14 of FIGS. 1 and 2 has a cladding 18 and a core 20. The cladding 18 and core 20 have different indices of refraction to provide a light guiding core region. Regardless of how fiber 14 is coupled to diode 12, the fiber 14 includes a reflective Bragg grating 22 for converting the emitted beam of diode 12 to either a single mode or multiple modes. However, there is no discussion of a multimode fiber/Bragg grating used as a sensor and "multimode" applies to laser modes, not fiber modes.

U.S. Pat. No. 5,307,437 to Facq et al is directed to an optical fiber incorporating a Bragg lattice and its application. As shown in the Figures, optical fiber 1 comprises a sheath 2, a core 3, and an axis 4. This optical fiber exhibits variations of refractive index which are disposed in plane, parallel, and periodic strata 5 of period I in the direction of the axis. The plane strata 5 are inclined at an angle in relation to the axis of the fiber. Optical fiber 1 includes a Bragg diffraction grating 6. The fiber of the invention can either be a monemode or a multimode fiber. FIGS. 7a and 7b illustrate the use of this invention as a sensor. The optical fiber 60 including a Bragg lattice 61 is placed at the center of a cylindrical reflector having a cross-section in the form of a circular arc 62. The azimuthal orientation of this reflector about the axis 63 of the fiber 60 is externally controlled between two positions, as seen in FIGS. 7a and 7b, respectively. There is no disclosure of mode population transfer in a multimode configuration.

U.S. Pat. No. 5,280,172 to Di Bin et al is directed to a fiber optic sensor for measuring gas. Each of the first three Figures illustrates the principle of an intrinsic fiber optic fiber, the fiber being monomode or multimode. The parts 9 with a variation in refractive index are constituted by zones or strata which are flat and parallel to each other and periodic. These strata preferentially extend into the core 5 and can continue into the optically neutral part of the cladding. These constitute Bragg diffraction gratings. There is no teaching of principles of multimode fiber Bragg gratings.

U.S. Pat. No. 5,305,335 to Ball et al is directed to a single longitudinal mode pumped optical waveguide laser arrangement. As seen in the Figures, pumped optical fiber laser 10 includes an optical fiber section 11 and a laser pump 12. Optical fiber section 11 includes a fiber core and a cladding surrounding the core, with the stimulating light from the laser pump 12 being launched into and guided in the core. As shown, the optical fiber section 11 is delimited, at respective ends thereof, by respective end faces 11a and 11b that are inclined at the Bragg angle with respect to the axis of the section 11 to minimize or eliminate undesired reflections therefrom. Only single mode fiber gratings are disclosed.

The following is an additional list of references referred to herein by number.

1. G. Meltz, W. W. Morey, and W. H. Glenn, "Formation of Bragg Gratings in Optical Fibers by a Transverse Holographic Method", Opt. Lett. 14, (1989) pp. 823–825.
2. R. M. Measures, "Smart Structure Technology and its Potential for Civil Engineering", Applications of Fiber Optic Sensors in Engineering Mechanics, F. Ansari, ed., American Society of Civil Engineers, New York, (1993), pp. 17–38.
3. M. H. Maher and E. G. Nawy, "Evaluation of Fiber Optic Bragg Grating Strain Sensor in High Strength Concrete Beams", Applications of Fiber Optic Sensors in Engineering Mechanics, F. Ansari, ed., American Society of Civil Engineers, New York, (1993), pp. 120–133.
4. A. D. Kersey, T. A. Berkoff, and W. W. Morey "Fiber-grating based strain sensor with phase sensitive detection", Proc. 1st European Conf. on Smart Structures and Materials, Glasgow, (1992) pp. 61–67.
5. A. D. Kersey, T. A. Berkoff, and W. W. Morey, "Multiplexed fiber Bragg grating strain-sensor system with a fiber Fabry-Perot wavelength filter", Opt. Lett., 18, (1993) pp. 1370–1372.
6. D. A. Jackson, A. B. Lobo Ribeiro, L. Reekie and J. L. Archambault, "Simple multiplexing scheme for a fiber-optic grating sensor network", Opt. Lett., 18, (1993) pp. 1192–1194.
7. V. Mizrahi and J. E. Sipe, "Optical Properties of Photosensitive Fiber Phase Gratings", J. Lightwave Technol., 11, (1993) pp. 1513–1517.
8. C. G. Askins, et al., Fiber Bragg reflectors prepared by a single excimer pulse", Optics Lett., 17, (1992) pp. 833–835.
9. C. G. Askins, M. A. Putnam, G. M. Williams, and E. J. Friebele, "Considerations for producing single-pulse fiber Bragg gratings", Proc. SPIE 2071, Distributed and Multiplexed Fiber Optic Sensors III, A. D. Kersey and J. P. Dakin, Ed. Sept. 1993, pp. 12–20.
10. B. Malo et al., "Single-excimer-pulse writing of fiber gratings by use of a zero-order nulled phase mask: grating spectral response and visualization of index perturbations", Opt. Lett., 18, (1993) pp. 1277–1279.
11. K. O. Hill, et al., "Bragg gratings fabricated in monomode photosensitive optical fiber by UV exposure through a phase mask", Appl. Phys. Lett., 62, (1993) 1035–1037.
12. H. Patrick and S. L. Gilbert, "Growth of Bragg Gratings Produced by Continuous-Wave Ultraviolet Light in Optical Fiber", Optics Lett., 18, (1993) pp. 1484–1486.
13. V. Mizrahi et al., "Ultraviolet laser fabrication of ultra-strong optical fiber gratings and of Germania-doped channel waveguides", Appl. Phys. Lett., 63, (1993) pp. 1727–1729.
14. C. G. Askins, et al., "Stepped-wavelength optical-fiber Bragg grating arrays fabricated in line on a draw tower", Optics Lett., 17, (1994) pp. 147–149.
15. K. O. Hill, et al., "Efficient Mode Conversion in Telecommunications Fibre using Externally Written Gratings", Electron Lett. 26, (1990) pp. 1270–1271.
16. F. Bilodeau, et al., "Efficient Narrowband $LP_{01} \leftrightarrows LP_{02}$ Mode Converters Fabricated in Photosensitive Fibre: Spectral Response", Electron. Lett. 17, (1991) pp. 682–684.
17. A. M. Vengsarkar, J. A. Greene, and K. A. Murphy, "Photoinduced refractive-index changes in two-mode, elliptical-core fibers: sensing applications", Optics Lett., 16, (1991) pp. 1541–1543.
18. A. M. Vengsarkar, J. A. Greene, and K. A. Murphy, "Spatially weighted, grating-based, two-mode, elliptical-core optical fiber vibration sensors", Optics Lett., 16, (1991) pp. 1707–1709.
19. C. X. Shi and T. Okoshi, "Analysis of a fiber-optic $LP_{01} \leftrightarrows LP_{02}$ mode converter", Opt. Lett., 17, (1992) pp. 719–721.
20. Y. W. Koh, S. H. Yun, and B. Y. Kim, "Mode Coupling Fiber Gratings for Fiber Optic Devices", Proc. 9th Int. Conf. on Optical Fiber Sensors, Firenze Italy, (1993) pp. 35–38.
21. K. H. Wanser, M. Haselhuhn, M. Lafond, and J. Williams, "Distributed Fiber Optic Sensors for Civil Structures using OTDR", Applications of Fiber Optic Sensors in Engineering Mechanics, F. Ansari, ed., American Society of Civil Engineers, New York, (1993), pp. 303–327.
22. F. X. Desforges, P. Graindorge, L. B. Jeunhomme, and H. J. Arditty, "Progress in OTDR Optical Fiber Sensor Networks", Proc. SPIE 718 (1986) pp. 225.
23. A. W. Snyder and J. D. Love, Optical Waveguide Theory, (Chapman and Hall, London), (1983), Chapter 13.
24. D. Gloge, "Weakly Guiding Fibers", Appl. Opt. 10, (1971) pp. 2252–2258.
25. P. M. Morse and H. Feshbach, Methods of Theoretical Physics, (McGraw-Hill, New York, 1953), Part I, pp. 810–811.
26. D. G. Hall, "Coupled-amplitude equations via a Green's function technique", Am. J. Phys., 61, (1993) pp. 44–49.
27. A. R. Mickelson and A. Weierholt, "Modal noise-limited signal-to-noise ratios in multimode optical fibers", Appl. Opt. 22, (1983) pp. 3084–3089.
28. C. Pask, "Equal excitation of all modes on an optical fiber", J. Opt. Soc. Am., 68, (1978) pp. 572.
29. D. Marcuse, "Excitation of Parabolic-Index Fibers with Incoherent Sources", Bell Sys. Tech. J., 54, (1975) pp. 1507–1530.
30. R. Olshansky, "Propagation in Glass Optical Waveguides", Rev. Mod. Phys., 51, (1979) pp. 341–367.
31. L. Jeunhomme and J. P. Pocholle, "Mode coupling in a multimode optical fiber with microbends", Appl. Opt., 14, (1975) pp. 2400–2405.
32. K. H. Wanser, K. F. Voss, and J. Williams, "Microbending, Kink Loss, Sensor Interaction Effects, and Localized Crack Detection using Optical Time Domain Reflectometry", Proc. Symposium on Time Domain Reflectometry in Environmental, Infrastructure, and Mining Applications, Northwestern University, Evanston, Ill., September 1994, U.S. Bureau of Mines.

33. A. D. Kersey, "Interrogation and Multiplexing Techniques for Fiber Bragg Grating Strain Sensors", Proc. SPIE 2071, Distributed and Multiplexed Fiber Optic Sensors III, A. D. Kersey and J. P. Dakin, Ed. Sept. 1993, pp. 30–48.

SUMMARY OF THE INVENTION

The invention resides in the use of multimode optical fibers and novel methods of creating Bragg gratings.

Bragg gratings are small periodic refractive index changes in the optical fiber which yield high light reflectivity when the wavelength of the incident light equals the Bragg wavelength and very low reflectivity otherwise. In conventional operation of single mode fiber Bragg gratings, under induced tensile strain in the optical fiber the Bragg wavelength is shifted by a small amount, which produces a change in reflectivity for sensing purposes.

The use of multimode fiber offers additional modes of operation of optical fiber Bragg gratings as well as enhanced sensitivity compared to single mode fiber. This is due to the multiwavelength response inherent with Bragg gratings in multimode optical fibers, which allows detection of transfer of mode population from one mode to another for sensing and diagnostic purposes. This allows for numerous new types of sensing applications, including chemical and environmental sensors.

Previously, both government and industry sponsored developments have been limited to single mode or at most two mode fibers. They have also been limited to laser-based procedures which are expensive and involve in-line processing with fiber draw before coating, or coating removal, lasing, and fiber recoating. The new methods utilize X-rays which do not require in-line processing during the fiber drawing process and for which no coating removal and replacement restrictions are necessary.

In one embodiment, the X-rays penetrate to the core and/or cladding of the optical fiber through the typical polymer coating; the exposure and location can be accurately controlled for Bragg grating formation and periodicity by spooling the optical fiber past the X-ray head without removal of fiber polymer coatings or replacement.

Similarly, in another embodiment, spooled, metal-coated fibers can be treated without coating removal by a high-voltage electron beam impinging on the metal coating. X-rays are then produced internally from the metal coating as a secondary emission into the optical fiber, for Bragg grating formation. The electron beam can be scanned to achieve the desired periodicity, length, and other desired characteristics of the grating. Non-metal-coated fibers can have their refractive indices modified and gratings written by use of an ion beam.

The multimode fiber Bragg grating responds to the modal power carried in each individual fiber mode group, thus yielding information about the local mode power distribution (MPD). This information is vital to the design of microbend and other modal-based sensors, as well as devices such as fiber mode scramblers. For the first time it allows in-situ diagnostic of the mode power distribution. Information on mode depopulation induced by a microbend sensor will allow improved sensor design and reduction of sensor interaction effects due to modal depopulation.

Due to the above unique local mode power sensing properties, a number of new sensing applications are made possible with multimode fiber Bragg gratings. In one embodiment, a Bragg grating is placed after a conventional microbend sensor to detect the mode power disturbance produced by the microbend sensor. This allows greatly enhanced back reflection of the microbend sensor, compared to the weak Rayleigh backscatter signal from an OTDR interrogated microbend sensor. This results in improving the signal by orders of magnitude and eliminating the need for signal averaging and making possible real time monitoring of structural vibration and strain. The combined use of multimode fiber Bragg gratings and conventional microbend sensors offers numerous sensor multiplexing schemes. In another embodiment, the multimode fiber Bragg grating just detects modal population changes in a length of fiber. This allows extremely sensitive interferometric speckle pattern changes to be monitored resulting from small temperature or vibration changes integrated along the length. The multimode fiber Bragg gratings have a much wider spectral response than the single mode fiber grating, encompassing approximately 20 nm in a typical 50/125 $\mu$m graded index fiber, thus eliminating the need for strict wavelength control of sources and gratings. The width of the spectral response is a function of the numerical aperture of the fiber.

OBJECTS OF THE INVENTION

It is a principal object of the present invention to provide a method and apparatus for marked increase in optical fiber sensor signal response to induced strain over conventional microbend techniques, while utilizing standard-production type multimode optical fibers and reflectometry interrogation.

It is another object of the invention to provide a method and apparatus for marked increase in optical fiber sensor signal response to induced strain over conventional strain and conventional microbend techniques while utilizing metal-coated, multimode optical fibers.

It is still another object of the invention to provide a method and apparatus for modal diagnostics of multi-event effects on sensor response to achieve calibrated or compensated output over relatively long distances as compared to single-mode systems.

It is still an additional object of the present invention to provide an electron or ion beam and/or X-Ray formation method for Bragg gratings wherein coating removal and replacement are obviated.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment of the invention when taken in conjunction with the following drawings in which:

FIG. 1(*a*) shows modal reflectivities for mode group 10 for strong (solid line) and weak (dashed line) 1 mm long gratings. FIG. 1(*b*) shows grating for strong (solid line) and weak (dashed line) 1 mm long gratings;

FIG. 8, comprising FIGS. 8(a) to 8(d), shows end-on views of a fiber core.

FIGS. 9, comprising FIGS. 9(a) to 9(c), shows a titled MMFBG.

DETAILED DESCRIPTION OF PREFERRED EMBODIMENTS

Figure 1A:
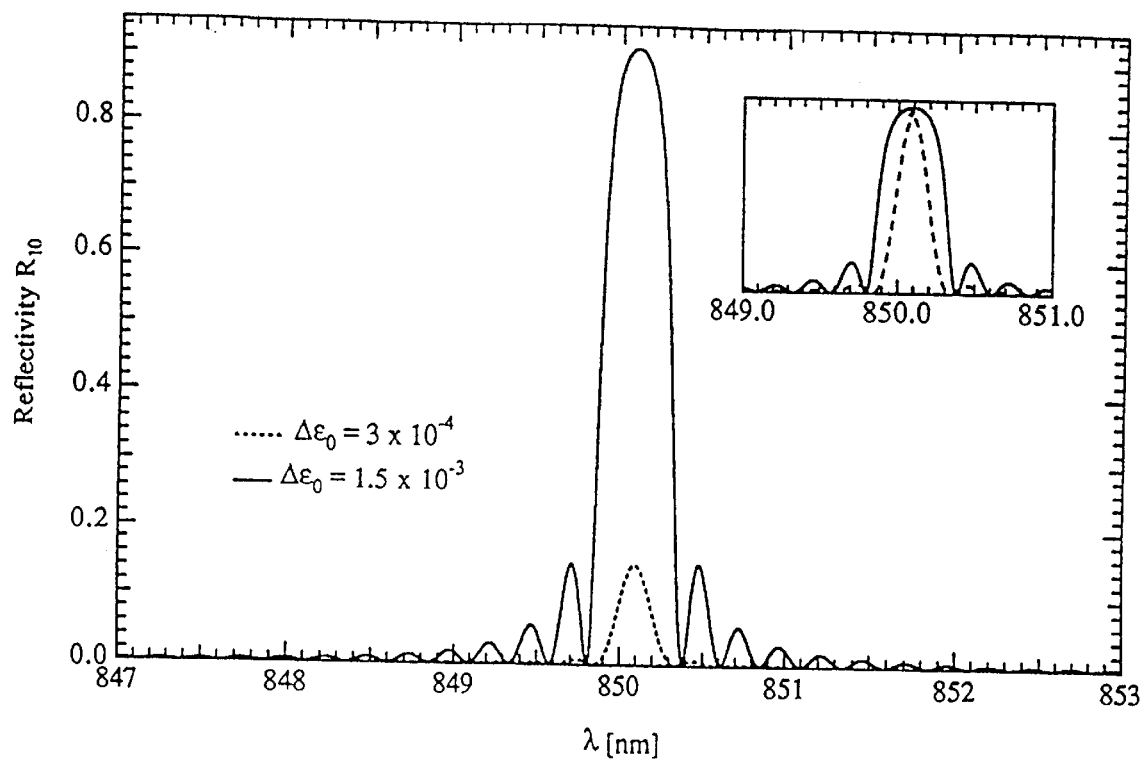
FIG. 1, comprising FIGS. 1(*a*) and 1(*b*), is a graphical illustration of modal and grating reflectivity under equal mode power distribution for a weak grating and a strong grating, respectively.

We study the grating reflectivity using the wave optics approach and weak guidance scalar LP modes (23–24). The Helmholtz equation for the x or y component of the electric field $\psi$ is $$[\nabla^2 + k^2 n^2(x,y,z)]\psi = 0 \tag{1.}$$

where $n(x, y, z)$ is the refractive index profile of the fiber (including the grating), $k=2\pi/\lambda_0$, and $\lambda_0$ is the vacuum wavelength. Since we are interested in forward bound mode to reflected bound mode transitions, the modal expansion for $\psi$ may be written in terms of bound modes only as $$\Psi(x,y,z) = \sum_\mu b_\mu(z)\phi_\mu(x,y) \tag{2.}$$

and the bound mode functions $\phi_{82}$ satisfy $$[\nabla_t^2 + (k^2 \bar{n}^2(x,y) - \beta_\mu^2)]\phi_\mu(x,y) = 0 \tag{3.}$$

where $\bar{n}^2(x, y)$ is the refractive index profile of the fiber in the absence of the grating $\nabla_t^2$ is the two dimensional transverse Laplacian. Substituting equation 2 into equation 1 and using equation 3 yields $$\sum_\mu \left\{ \frac{d^2 b_\mu(z)}{dz^2} + \beta_\mu^2 b_\mu(z) \right\} \phi_\mu(x,y) = \tag{4.}$$

-continued
$$\sum_\mu - k^2 [n^2(x,y,z) - \bar{n}^2(x,y)] b_\mu(z)\phi_\mu(x,y)$$

Multiplying equation 4 on the left by $\phi^*_\alpha$, integrating over the infinite cross sectional area A∞, and using the bound mode orthogonality we obtain the coupled equations for the mode amplitudes $b_\alpha$ (z)

$$\frac{d^2 b_\alpha(z)}{dz^2} + \beta_\alpha^2 b_\alpha(z) = \sum_\mu D_{\alpha\mu}(z) b_\mu(z) \tag{5.}$$

where the (z dependent) coupling coefficients $D_{\alpha\mu}$ (z) are given by $$D_{\alpha\mu}(z) = \frac{-k^2 \int_{A\infty} d^2x [n^2(x,y,z) - \bar{n}^2(x,y)] \phi_\alpha^*(x,y)\phi_\mu(x,y)}{\int_{A\infty} d^2x \phi_\alpha^*(x,y)\phi_\alpha(x,y)} \tag{6.}$$

Equations 5 and 6 are exact reformulations of the scalar wave equation in the presence of z dependent non-uniform refractive index perturbations. The form of equation 5 is not very useful when hundreds of modes are present. Equation 5 can be rewritten as an integral equation by using the Green's function for the one dimensional Helmholtz equation as $$b_\alpha(z) = b_\alpha^{(0)}(z) + \sum_\mu \int_{-\infty}^{\infty} dz' G_\alpha(z,z') D_{\alpha\mu}(z') b_\mu(z') \tag{7.}$$

where $b_\alpha^{(0)}(z)$ is a solution to the homogeneous equation (equation 5 with the right hand side set to zero) chosen to satisfy the boundary conditions, and the Green's function $G_\alpha(z, z')$ satisfies $$\frac{d^2 G_\alpha(z,z')}{dz^2} + \beta_\alpha^2 G_\alpha(z,z') = \delta(z-z') \tag{8.}$$

For outgoing wave boundary conditions appropriate to backward and forward scattering, the Green's function for equation 8 is given by (25)

$$G_\alpha(z,z') = \frac{e^{i\beta_\alpha|z-z'|}}{2iB_\alpha} \tag{9.}$$

TRANSFORMATION TO COUPLED FIRST ORDER EQUATIONS

For some purposes it is more convenient to transform the set of coupled second order differential equations (equation 5) into a set of couple first order equations. The procedure is a generalization of that given by Hall (26). Substitution of equation 9 into equation 7 yields $$b_\alpha(z) = b_\alpha^{(0)}(z) + \sum_\mu \int_{-\infty}^{z} dz' \frac{e^{i\beta_\alpha(z-z')}}{2i\beta_\alpha} D_{\alpha\mu}(z')b_\mu(z') + \tag{10.}$$

$$\sum_\mu \int_{z}^{\infty} dz' \frac{e^{-i\beta_\alpha(z-z')}}{2i\beta_\alpha} D_{\alpha\mu}(z')b_\mu(z')$$

or rewriting $$b_\alpha(z) = A_\alpha^+(z)e^{i\beta_\alpha z} + A_\alpha^-(z)e^{-i\beta_\alpha z} \tag{11.}$$

where $$A_\alpha^+(z) = \sum_\mu \int_{-\infty}^z dz' \frac{e^{-i\beta_\alpha z'}}{2i\beta_\alpha} D_{\alpha\mu}(z')b_\mu(z') + A_{0\alpha}^+ \quad (12.)$$

and $$A_\alpha^-(z) = \sum_\mu \int_z^\infty dz' \frac{e^{i\beta_\alpha z'}}{2i\beta_\alpha} D_{\alpha\mu}(z')b_\mu(z') + A_{0\alpha}^- \quad (13.)$$

and $A_{0\alpha}^\pm$ are constants chosen to satisfy the boundary conditions given explicitly by $$b_\alpha^{(0)}(z) = A_{0\alpha}^+ e^{i\beta_\alpha z} + A_{0\alpha}^- e^{-i\beta_\alpha z} \quad (14.)$$

Note that equation 14 is the general solution to equation 5 when the coupling coefficients $D_{\alpha\mu}(z)$ are zero. Differentiating equations 12 and 13 and using equation 11 we find the set of first-order coupled mode equations $$\frac{dA_\alpha^+}{dz} = \sum_\mu \frac{D_{\alpha\mu}(z)}{2i\beta_\alpha} [A_\mu^+ e^{i(\beta_\mu-\beta_\alpha)z} - A_\mu^- e^{-i(\beta_\mu+\beta_\alpha)z}] \quad (15.)$$

$$\frac{dA_\alpha^-}{dz} = -\sum_\mu \frac{D_{\alpha\mu}(z)}{2i\beta_\alpha} [A_\mu^+ e^{i(\beta_\mu+\beta_\alpha)z} + A_\mu^- e^{-i(\beta_\mu-\beta_\alpha)z}] \quad (16.)$$

The virtue of the first order equations 15 and 16 is that the forward and backward traveling wave amplitudes have been explicitly separated out and the coupling between them is clearly manifest. The form of the equations also makes clear how to apply the synchronous approximation in order to treat cases of strong coupling between modes, such as occurs for large grating reflectivity.

LOW REFLECTANCE GRATING SOLUTION

For the case of weak backreflection of only a few percent or less, a perturbation solution to equation 7 is appropriate. For many situations in distributed sensing, a 1% reflection per sensor would enhance the reflected signal by 3 to 4 orders of magnitude, depending on the pulse width, compared to the weak Rayleigh backscattering from a short sensing length of fiber (21). This would allow the possibility of real time monitoring of reflections, with little or no averaging required for good signal to noise ratio. In such weakly reflecting situations, the first Born approximation is adequate and the approximate solution to equation 7 is $$b_\alpha(z) \approx b_\alpha^{(0)}(z) + \sum_\mu \int_{-\infty}^\infty dz' G_\alpha(z,z') D_{\alpha\mu}(z') b_\mu^{(0)}(z') \quad (17.)$$

or rewriting using equation 9

$$b_\alpha(z) \approx b_\alpha^{(0)}(z) + \sum_\mu \int_{-\infty}^\infty dz' \frac{e^{i\beta_\alpha|z-z'|}}{2i\beta_\alpha} D_{\alpha\mu}(z') b_\mu^{(0)}(z') \quad (18.)$$

The second term in equation 18 generates forward single scattered and backward single scattered waves due to the z dependent refractive index perturbation. In order to isolate the reflected wave, we assume that the refractive index perturbation is zero for $z<z_{min}$. Furthermore, we assume an incident wave traveling in the positive z direction with modal amplitudes given by $$b_\alpha^{(0)}(z) = b_{0\alpha} e^{i\beta_\alpha z} \quad (19.)$$

Substituting equation 19 into equation 18 yields for $z<z_{min}$ $$b_\alpha(z) = b_{0\alpha} e^{i\beta_\alpha z} + \sum_\mu \frac{e^{-i\beta_\alpha z}}{2i\beta_\alpha} \int_{z_{min}}^\infty dz' D_{\alpha\mu}(z') b_{o\mu} e^{i(\beta_\alpha+\beta_\mu)z'} \quad (20.)$$

The first term in equation 20 is the incident wave traveling in the positive z direction, and the second term is the lowest order expression for the reflected wave traveling in the negative z direction. The back reflected modal amplitudes $b_\alpha^R(z)$ are thus given in terms of the incident mode amplitudes by $$b_\alpha^R(z) = \sum_\mu \frac{e^{-i\beta_\alpha z}}{2i\beta_\alpha} \int_{z_{min}}^\infty dz' D_{\alpha\mu}(z') b_{o\mu} e^{i(\beta_\alpha+\beta_\mu)z'} \quad (21.)$$

The total power incident on the grating is $$P_0 = \sum_\mu |b_\mu^{(0)}|^2 \quad (22.)$$

and the total power reflected by the grating is $$P_R = \sum_\mu |b_\mu^R|^2 \quad (23.)$$

thus the grating reflectivity R is given by $$R = \frac{P_R}{P_0} = \frac{\sum_\mu |b_\mu^R|^2}{\sum_\mu |b_\mu^{(0)}|^2} \quad (24.)$$

A useful quantity is the modal reflectivity $R_\mu$ defined by $$R_\mu = \frac{|b_\mu^R|^2}{|b_\mu^{(0)}|^2} \quad (25.)$$

which is the power reflection coefficient for each mode.

INDEPENDENT MODE GRATINGS

The simplest type of multimode fiber grating is one whose refractive index can be written as $$n^2(x,y,z) = \bar{n}^2(x,y) + \Delta\in(z) \quad (26.)$$

where $\Delta\in(z)$ is a transversely uniform dielectric perturbation. Note that the refractive index perturbation is related to the dielectric perturbation by $\Delta\in = 2\bar{n}\Delta n$. For this case, the mode coupling coefficient is diagonal, due to mode orthogonality, and can be written using equation 6 as $$D_{\alpha\mu}(z) = -k^2 \Delta\in(z) \delta_{\alpha\mu} \quad (27.)$$

where $\delta_{\alpha\mu}$ is the Kronecker delta symbol. Substitution of equation 27 into equation 5 yields $$\frac{d^2 b_\alpha(z)}{dz^2} + \beta_\alpha^2 b_\alpha(z) = -k^2 \Delta\epsilon(z) b_\alpha(z) \quad (28.)$$

which shows that the exact modal amplitudes are independent of each other, and thus the reflectivity of an individual mode is unaffected by the other modes for this type of grating, thus the name "independent mode" grating.

The fiber core is sometimes assumed to contain the refractive index grating (12), but this need not be the case in general (9). For highly multimode fibers with large numerical aperture, a very small amount of the mode power resides in the fiber cladding, so that it makes little difference whether or not the grating perturbation extends past the core region or not for the purposes of calculating the diagonal mode coupling coefficient. In the case of more general transverse spatial variation of the grating perturbation, we define independent mode gratings as those where the mode coupling coefficient is strongly diagonal so that $$D_{\alpha\mu}(z)=D_{\alpha\alpha}(z)\delta_{\alpha\mu} \tag{29.}$$

Inserting this form into equations 15 and 16 yields the exact first order equations for independent mode gratings, $$\frac{dA_\alpha^+}{dz} = \frac{D_{\alpha\alpha}(z)}{2i\beta_\alpha} [A_\alpha^+ + A_\alpha^- e^{-2i\beta_\alpha z}] \tag{30.}$$

$$\frac{dA_\alpha^+}{dz} = \frac{D_{\alpha\alpha}(z)}{2i\beta_\alpha} [A_\alpha^+ e^{2i\beta_\alpha z} + A_\alpha^-] \tag{31.}$$

Equations 30 and 31 clearly show that the forward and backward traveling wave amplitude for a given mode are independent of the amplitudes of the other modes for this type of grating.

Substitution of equation 29 into equation 21 yields the reflected mode amplitudes $$b_\alpha^R(z) = \frac{b_{o\alpha} e^{-i\beta_\alpha z}}{2i\beta_\alpha} \int_{z_{min}}^{\infty} dz' D_{\alpha\alpha}(z') e^{2i\beta_\alpha z'} \tag{32.}$$

Substitution of equation 32 into equations 24 and 25 yields the grating reflectivity and modal reflectivity for low reflectance independent mode gratings $$R = \frac{\sum_\mu \frac{|b_{o\mu}|^2}{4\beta_\mu^2} \left| \int_{z_{min}}^{\infty} dz' D_{\mu\mu}(z') e^{2i\beta_\mu z'} \right|^2}{\sum_\mu |b_{o\mu}|^2} \tag{33.}$$

$$R_\mu = \frac{1}{4\beta_\mu^2} \left| \int_{z_{min}}^{\infty} dz' D_{\mu\mu}(z') e^{2i\beta_\mu z'} \right|^2 \tag{34.}$$

so that the grating reflectivity can be written $$R = \frac{\sum_\mu |b_{o\mu}|^2 R_\mu}{\sum_\mu |b_{o\mu}|^2} \tag{35.}$$

Note that equation 35 can also be written in the general case for independent mode gratings, by using exact solutions for $R_\mu$. The important point is that the reflectivity spectrum is the sum of the modal reflectivity spectrum for each mode weighted by the fraction of the total power carried by the mode. For the case of weak gratings the modal reflectivity is just the Fourier transform of the longitudinal grating perturbation. In this limit various effects can be readily studied, such as chirped gratings and Gaussian envelopes on the grating perturbation. The case of a purely periodic grating perturbation will be treated in the following section for both strong and weak gratings.

PERIODIC GRATING PERTURBATION

Now we examine the case of a finite length periodic grating perturbation located between z=0 and z=L of the form $$n^2(x,y,z) = \bar{n}^2(x,y) + \Delta\epsilon_0 \cos(qz+\delta) f(x,y) \tag{36.}$$

where $\Delta\epsilon_0$ is the maximum value of the dielectric perturbation and f(x, y) describes the distribution of the transverse grating perturbation and is taken to be between 0 and 1. Using equation 36 in equation 6 we find $$D_{\mu\mu}(z) = -k^2 \Delta\epsilon_0 \cos(qz+\delta) \eta_\mu \tag{37.}$$

where the dimensionless mode efficiency factor $\eta_\mu$ is given by $$\eta_\mu = \frac{\int_{A_\infty} d^2x f(x,y) \phi_\mu^*(x,y) \phi_\mu(x,y)}{\int_{A_\infty} d^2x \phi_\mu^*(x,y) \phi_\mu(x,y)} \tag{38.}$$

Note that $\eta_\mu$ is between 0 and 1 and represents the fraction of the power of the mode that the grating perturbation interacts with. Depending on the details of the transverse spatial distribution of the grating, $\eta_{82}$ can be quite different for different modes, in contrast to the case of single mode fibers. For the case of transversely uniform grating, $\eta_\mu$ is one for all the modes.

Substitution of equation 37 into equation 34 yields the modal reflectivity $$R_\mu = \left[ \frac{k^2 \Delta\epsilon_0 \eta_\mu}{4\beta_\mu} \right]^2 \left| \frac{e^{-i\delta}(e^{i(2\beta_\mu - q)L} - 1)}{i(2\beta_\mu - q)} + \frac{e^{i\delta}(e^{i(2\beta_\mu + q)L} - 1)}{i(2\beta_\mu + q)} \right|^2 \tag{39.}$$

which can be rewritten as $$R_\mu = \left[ \frac{k^2 L \Delta\epsilon_0 \eta_\mu}{4\beta_\mu} \right]^2 \left\{ \frac{\sin^2[(2\beta_\mu - q)L/2]}{[(2\beta_\mu - q)L/2]^2} + \frac{\sin^2[(2\beta_\mu + q)L/2]}{[(2\beta_\mu + q)L/2]^2} + \frac{2\cos(qL + 2\delta)\sin[(2\beta_\mu - q)L/2]\sin[(2\beta_\mu + q)L/2]}{[(2\beta_\mu - q)L/2][(2\beta_\mu + q)L/2]} \right\} \tag{40.}$$

The first term in equation 39 is resonant when the phase matching condition $2\beta_\mu = q$ is met, while the second term is always nonresonant and small, since $\beta_\mu$ and q are both positive. Because of this, the first term in equation 40 strongly dominates in all practical situations where $(2\beta_\mu + q)L/2 \gg 1$.

COUPLED MODE THEORY SOLUTION FOR STRONG SINUSOIDAL GRATINGS

For strong gratings perturbation theory is inadequate. In the case of independent mode gratings, the modal reflectivity can be found using the first order couple mode equations 30 and 31. Using equation 37 we find $$\frac{dA_\alpha^+}{dz} = \frac{-k^2\Delta\epsilon_o\eta_\alpha}{2i\beta_\alpha} \cos(qz+\delta)[A_\alpha^+ + A_\alpha^- e^{-2i\beta_\alpha z}] \quad (41.)$$

$$\frac{dA_\alpha^+}{dz} = \frac{k^2\Delta\epsilon_o\eta_\alpha}{2i\beta_\alpha} \cos(qz+\delta)[A_\alpha^+ e^{2i\beta_\alpha z} + A_\alpha^-] \quad (42.)$$

The form of the perturbation solution equation 39 shows that only terms that are nearly phase matched are of importance in the solution. In the synchronous or rotating wave approximation, only the terms that are slowly varying are kept so that equations 41 and 42 become $$\frac{dA_\alpha^+}{dz} = \frac{ik^2\Delta\epsilon_o\eta_\alpha}{4\beta_\alpha} e^{-i(2\beta_\alpha-q)z+i\delta}A_\alpha^- \quad (43.)$$

$$\frac{dA_\alpha^-}{dz} = \frac{-ik^2\Delta\epsilon_o\eta_\alpha}{4\beta_\alpha} e^{i(2\beta_\alpha-q)z-i\delta}A_\alpha^+ \quad (44.)$$

Equations 43 and 44 are to be solved for the boundary conditions that waves are incident from the left so that $A_\alpha^-(L)=0$ and the initial mode amplitudes of equation 19 are specified (i.e. $A_\alpha^+(0)=b_{0\alpha}$). The solution of these equations appropriate for the boundary conditions yields the backward reflected mode amplitudes in terms of the initial forward mode amplitudes $$A_\alpha^-(0) = \frac{i\kappa_\alpha e^{-i\delta}\left(e^{2\sqrt{\kappa_\alpha^2-Q_\alpha^2}\,L} - 1\right)A_\alpha^+(0)}{\left[\sqrt{\kappa_\alpha^2-Q_\alpha^2}\left(e^{2\sqrt{\kappa_\alpha^2-Q_\alpha^2}\,L}+1\right)+iQ_\alpha\left(e^{2\sqrt{\kappa_\alpha^2-Q_\alpha^2}\,L}-1\right)\right]} \quad (45.)$$

so that the modal reflectivity is $$R_\alpha = \frac{|A_\alpha^-(0)|^2}{|A_\alpha^+(0)|^2} = \frac{\left|\kappa_\alpha\left(e^{2\sqrt{\kappa_\alpha^2-Q_\alpha^2}\,L}-1\right)\right|^2}{\left|\sqrt{\kappa_\alpha^2-Q_\alpha^2}\left(e^{2\sqrt{\kappa_\alpha^2-Q_\alpha^2}\,L}+1\right)+iQ_\alpha\left(e^{2\sqrt{\kappa_\alpha^2-Q_\alpha^2}\,L}-1\right)\right|^2} \quad (46.)$$

where the coupling constants $\kappa_\alpha$ and detuning wavenumbers $Q_\alpha$ are given by $$\kappa_\alpha = \frac{k^2\Delta\epsilon_o\eta_\alpha}{4\beta_\alpha} \quad (47.)$$

$$Q_\alpha = \beta_\alpha - q/2 \quad (48.)$$

Note that equation 46 can be used for strong or weak gratings, and gives the same results as equation 40 in the weak grating limit $\kappa_\alpha L \ll 1$. For the case of zero detuning, the peak reflectivity is $R_\alpha = \tanh^2(\kappa_\alpha L)$. As noted earlier, equation 46 can be used in equation 35 for the case of strong gratings.

By adjustment of the transverse grating distribution, it is possible to make $\eta_\alpha$ large for some modes and small for others, thus giving large reflectivity for some modes and small for others. A simple example of this is a radially symmetric perturbation confined close to the fiber axis, so that only the low order modes have an appreciable reflection efficiency factor. The higher order modes do not "see" the perturbation in this case, since the majority of their power is not confined close to the fiber axis. Such engineering of the transverse grating perturbation will allow for the design of numerous types of mode mixers, mode filters, and reflectivity spectra.

MODE POWER DISTRIBUTION

Equation 35 shows that the grating reflectivity spectrum for independent mode gratings depends on the mode power distribution (MPD). Thus the independent mode gratings can serve in-situ mode population sensors, since the amplitude of the reflectance for each peak in the spectrum is proportional to the local power carried by each mode. We emphasize that this is true regardless of the incident mode population distribution. In order to understand the operation of MMF gratings, it is necessary to address the effects of the mode population. The most widely used distribution is the equal MPD (27). In this distribution, all modes are excited independently and with equal power. This situation has been shown to occur after an incoherent, Lambertian source launch (28). It is also appropriate to an LED launch in many cases (29). For the case of equal MPD the initial mode amplitudes are, $$b_{o\mu} = \frac{e^{i\phi_\mu}}{\sqrt{N_{bm}}} \quad (49.)$$

where $\phi_\mu$ is the initial mode phase and $N_{bm}$ is the number of bound modes supported by the fiber at a given wavelength (including both polarizations and mode orientations). For $\alpha$ profile fibers $N_{bm}$ is given by (30)

$$N_{bm} = \frac{\alpha V^2}{2(\alpha+2)} \quad (50.)$$

where $\alpha$ is the fiber power law exponent ($\alpha=2$, for parabolic graded index and $\alpha=\infty$ for step index fibers), $V=ka\sqrt{n_{co}^2-n_{cl}^2}$, where $2a$ is the fiber core diameter and $n_{co}$ and $n_{cl}$ are maximum and minimum core and cladding refractive indices respectively.

Substituting equation 49 into equation 35, the grating reflectivity for equal MPD is just the average of the individual modal reflectivities, $$R = \frac{1}{N_{bm}} \Sigma_\mu R_\mu \quad (51.)$$

In order to evaluate the modal and grating reflectivities for multimode optical fibers using equations 40 or 46, expressions for the mode propagation constants are required. The propagation constant for power law refractive index profiles can be written in terms of the principal mode number (39) or mode group number m as $$\beta_m = kn_{co}\sqrt{1-2\Delta(m/M)^{2\alpha/(\alpha+2)}} \quad (52.)$$

where Δ is the index profile height parameter given by $$\Delta = \frac{n_{co}^2 - n_{cl}^2}{2n_{co}^2} \quad (53.)$$

and M is the greatest integer not larger than $\sqrt{N_{bm}}$. The principle mode group number m is expressed in terms of the angular mode number l and the radial mode number n as $$m = 2n + l + 1 \quad (54.)$$

It is clear from equation 54 that several combinations of positive integer values of l and n can give the same integer value for the principal mode number m, and thus the same value for the propagation constant. This situation is referred to as degeneracy. In the case where the mode efficiency factors are the same for all modes in a mode group (such as for a transversely uniform grating perturbation), the modal reflectivity for each mode in a mode group is identical. In such cases the number of terms in the sum over modes in equation 51 may be greatly reduced by taking this propagation constant degeneracy into account. This can be done by writing the sum over modes as a sum over the principal mode group number m and introducing the mode group degeneracy factor $g_m$. The equal MPD grating reflectivity can then be written as $$R = \frac{1}{N_{bm}} \sum_{m=1}^{M} g_m R_m \quad (55.)$$

where the degeneracy factor $g_m$ is given by $$g_m = \begin{cases} \frac{m+1}{2} ; & m \text{ odd} \\ \frac{m}{2} ; & m \text{ even} \end{cases} \quad (56.)$$

This simple observation reduces the number of terms to evaluate from $N_{bm}$ to M. In case of a typical commercial multimode graded index fiber, the number of terms is reduced from several hundred to a few tens of terms. The significance of rewriting the grating reflectivity in terms of modal degeneracies allows one to explicitly see that the grating reflectivity under equal MPD will be substantially higher for the higher order modes, since there are more of them, and the peak reflectivities for all modes are nearly the same (at least for nearly uniform transverse grating distributions).

SENSOR ADDRESSING AND MULTIPLEXING

Figure 1B:
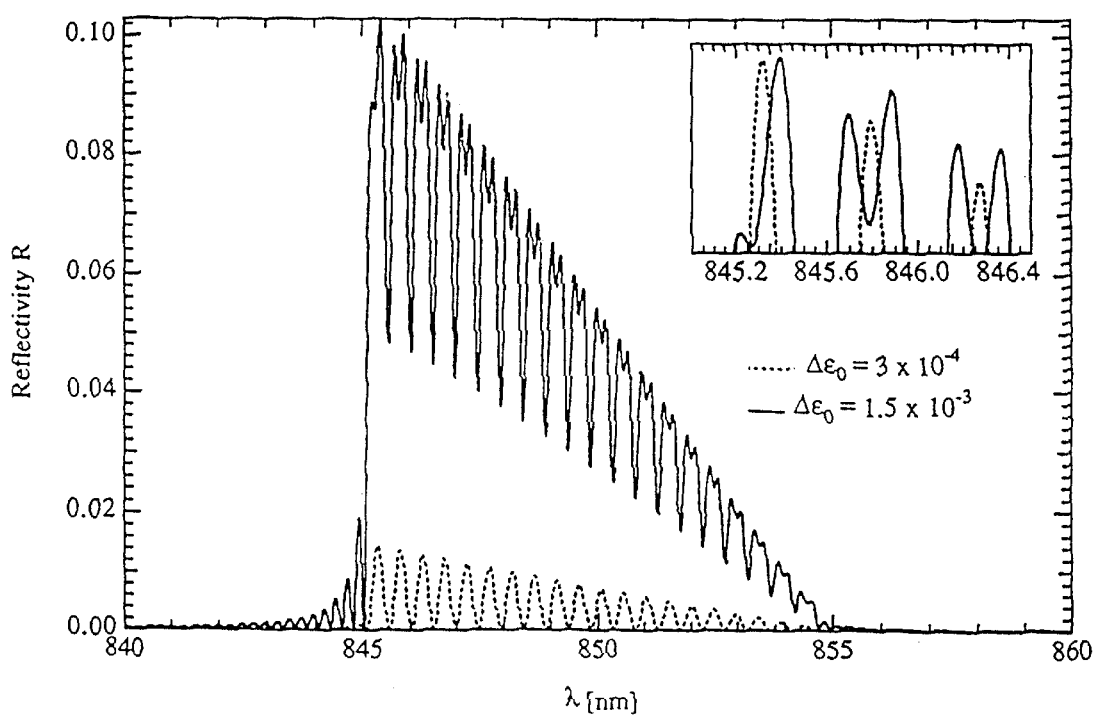
Figure 2A:
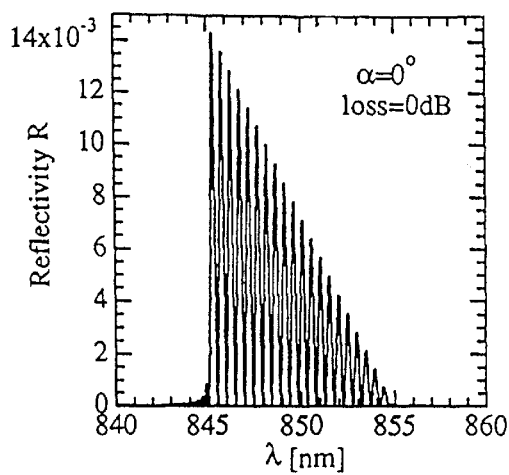
FIG. 2, comprising FIGS. 2(*a*) through 2(*f*), is a graphical illustration of grating reflectivities downstream of a fiber kink for various kink angles. Same parameters are used as for the weak grating case in FIG. 1. All-mode wave optics calculations for equal MPD excitation prior to kink, average of 1000 random initial phase configurations.
Figure 2B:
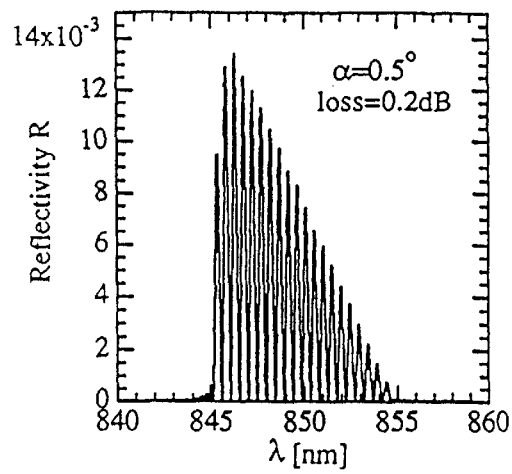
Figure 2C:
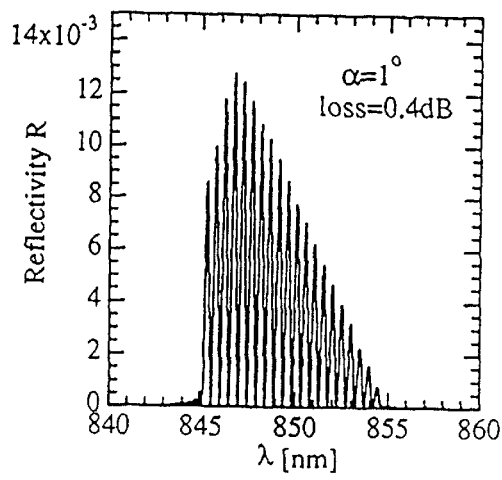
Figure 2D:
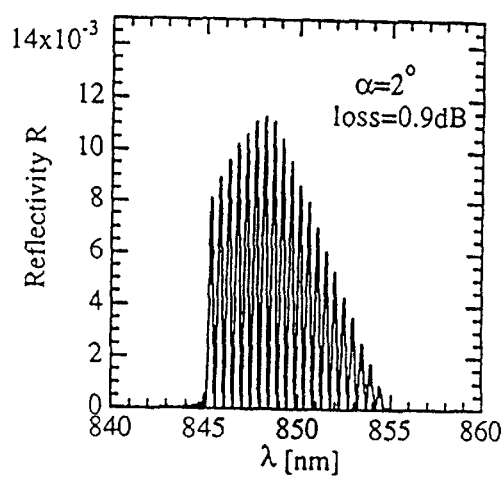

FIG. 1 shows modal and grating reflectivity under equal MPD excitation for transversely uniform graded index MMF Bragg gratings. FIG. 1(a) modal reflectivities for mode group 10 for strong (solid line) and weak (dashed line) 1 mm long gratings. Inset shows detail of weak and strong gratings compared on different scales to emphasize line broadening from saturation. FIG. 1(b) grating reflectivity for strong (solid line) and weak (dashed line) 1 mm long gratings. Note the line splitting effect near the maxima for the strong grating due to overlap of strong secondary maxima from adjacent modes. Inset shows details of peak maxima on different scales to emphasize the splitting effect. Fiber parameters used; 50 μm core diameter, numerical aperture NA=0.22, core refractive index $n_{co}$=1.458. $\Delta\epsilon_0=3\times10^{-4}$ and $\Delta\epsilon_0=15\times10^{-4}$ for the weak and strong gratings respectively. Note how wide the MMF spectrum in FIG. 1(b) is compared to the single mode reflectivity curve in FIG. 1(a). This spectral width is determined by the fiber NA for MMF Bragg gratings, and is much larger in general than a comparable reflectivity single mode grating and is given by $$\Delta\lambda = \frac{2\Lambda_g NA^2}{2n_{co}} ,$$

independent of the grating length L where $n_{co}$ is the maximum fiber refractive index, and $\Lambda_g$ is the grating period. This is to be contrasted with the width of a single mode FBG which is given by $$\Delta\lambda = \frac{2\Lambda_g^2 n_{co}}{L} .$$

FIG. 2, comprising FIGS. 2(a) through 2(f) shows the change in the reflection spectrum of the grating due to a single kink of various angles α prior to the grating. The kink in the fiber alters the MPD incident on the grating (31, 32). The kink produces both loss and mode coupling/redistribution effects. Localized kinks are especially interesting for sensing with multimode fibers, since a relatively large amount of power is lost for very little kinking compared to other types of microbends. FIG. 2 illustrates grating reflectivities downstream of a fiber kink for various kink angles. Same parameters used as for the weak grating case in FIG. 1. Note the non-monotonic change in the reflectance spectra for increasing kink loss. All-mode wave optics calculations for equal MPD excitation prior to kink, average 1000 random initial phase configurations.

The multiple peaked spectrum in the figures arises due to the dispersion of the Bragg condition for each fiber mode. The spectrum is determined by both the modal power distribution and the effective peak reflectivity of the grating for each mode (which will differ in the general case due to differing mode efficiency factors). The grating in a multimode fiber effectively encodes the light in a particular mode by the Bragg wavelength condition for that mode, and thus allows remote passive determination of the modal population in the fiber at the sensor location from the measured output wavelength distribution. This is a unique and novel property which leads to a variety of simple new fiber sensing concepts. Here we outline a few possible sensing alternatives, and techniques to address multiple sensor elements using a single source. Additional techniques, which have been developed for single mode fiber grating sensor systems have been discussed elsewhere (33).

Figure 3:
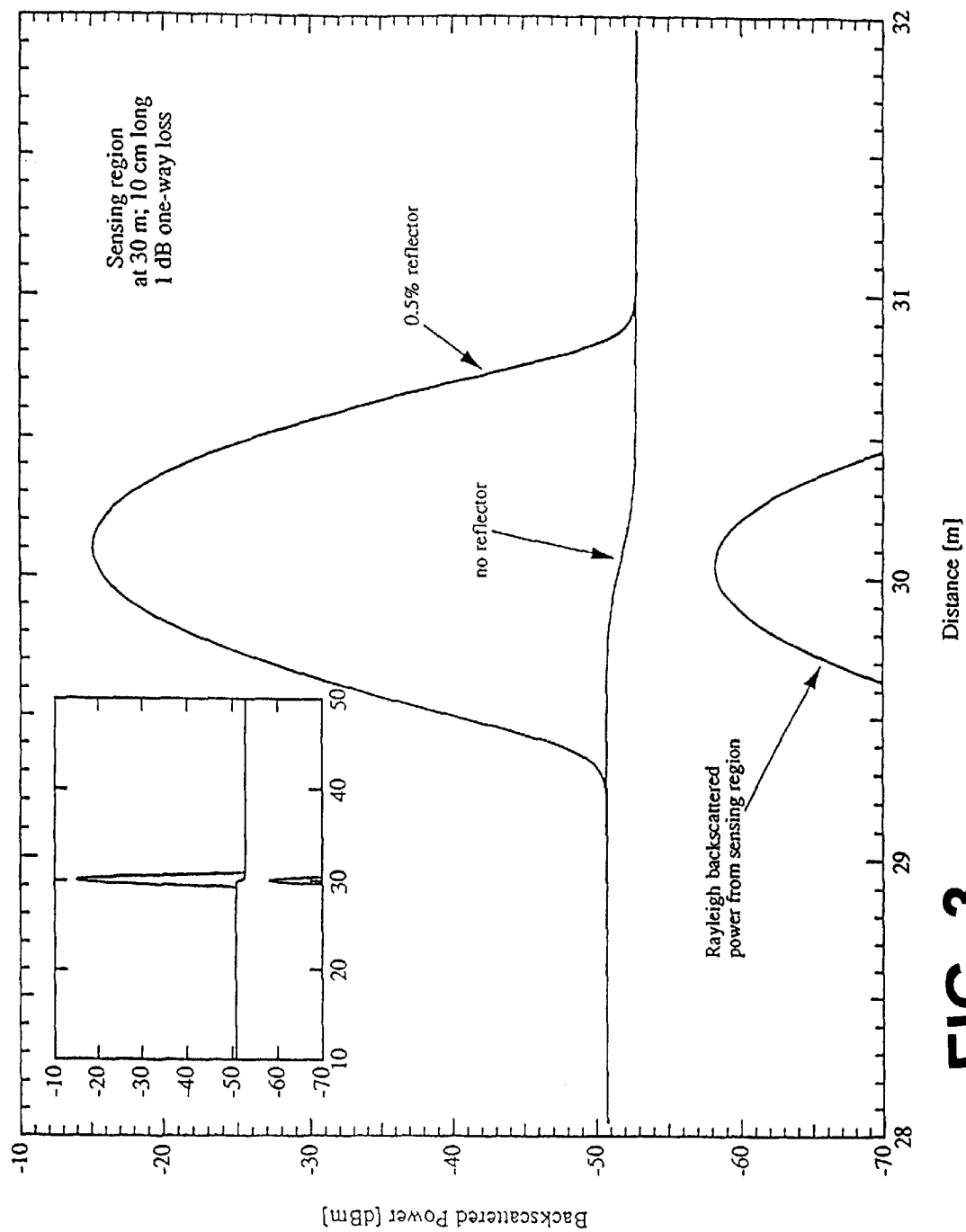
FIG. 3 is a graph of single pulse OTDR backscattered power from a graded index multimode fiber showing the enhanced signal from a 0.5% reflector placed immediately after a 1 dB loss region. Parameters for the graph are: Gaussian pulse full width half maximum=4 nsec., 10 dBm peak launch power, fiber NA=0.22, 1.5 dB/km scattering attenuation, 2.48 dB/km total attenuation (except in the 10 cm long high loss region)

In one of the simplest sensing methods using a MMF Bragg grating, a broadband light source such as an LED is used in a typical optical reflectometry scheme. If the source bandwidth encompasses the grating bandwidth, then the integrated reflectivity will be independent of the MPD incident on the granting (provided the mode efficiency factors are comparable). This can be shown by assuming the source bandwidth to be flat over the width of the grating reflectivity and integrating equation 35 over the source spectrum. In this case the grating will simply act like a Fresnel reflection following a sensing loss region, and no modal properties of the grating are ue, other than its broad reflection bandwidth. FIG. 3 shows what a realistic single pulse OTDR trace would look like with an integrated grating reflectivity of 0.5% following a 10 cm long, 1 dB one-way loss region. The height of the reflection peak due to the grating tracks the sensing region loss in this case, yielding a signal that is 38 dB above the Rayleigh backscattered light, with a corresponding 3.8 orders of magnitude reduction in data acquisition time compared to methods based on Rayleigh backscatter. Time consuming signal averaging would be eliminated in this implementation. Clearly several such sensors could be addressed serially.

Figure 4:
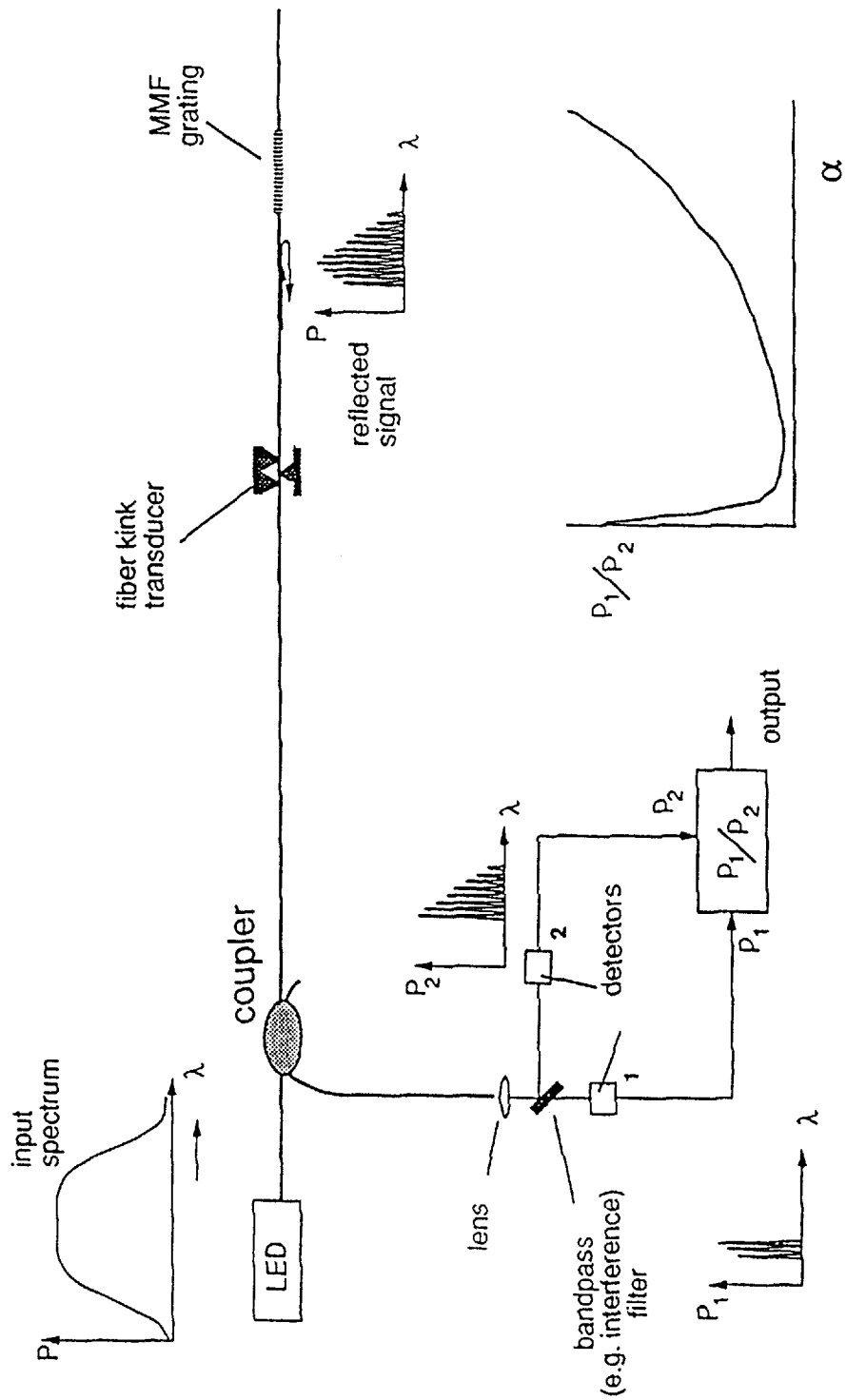
FIG. 4 is a block diagram illustrating the wavelength ratiometric technique for sensing mode coupling induced at a sensing transducer located prior to a MMF Bragg grating.

For a small kink angle ($\alpha<1°$) in the fiber prior to a MMF grating, a distinct change in the modal power distribution is indicated by the redistribution of the reflected power vs. wavelength, as shown in FIG. 2. FIG. 4 shows an arrangement for utilizing this shift in modal power distribution for sensing. Here, light from a broadband source, such as an LED, is coupled through the fiber sensing region to the MMF grating element, and the back-reflected signal is diverted to a detector using a coupler as shown. It is noted that the use of a large core multimode fiber allows efficient coupling of the light from an LED to the fiber core, in contrast to the case of a single mode fiber. The fiber sensing region is coupled to a micro-bend type transducer which induces a variable kink loss in the fiber in response to a sensed parameter. Other types of transducers could be used. At the fiber output an angled interference filter is arranged in order to pass the light from the first mode, or first few modes, onto a photodetector, while the light from the other modes is reflected onto a second detector. The ratio of the signal at detector 1 to that at detector 2 is a function of the kink angle.

Figure 5:
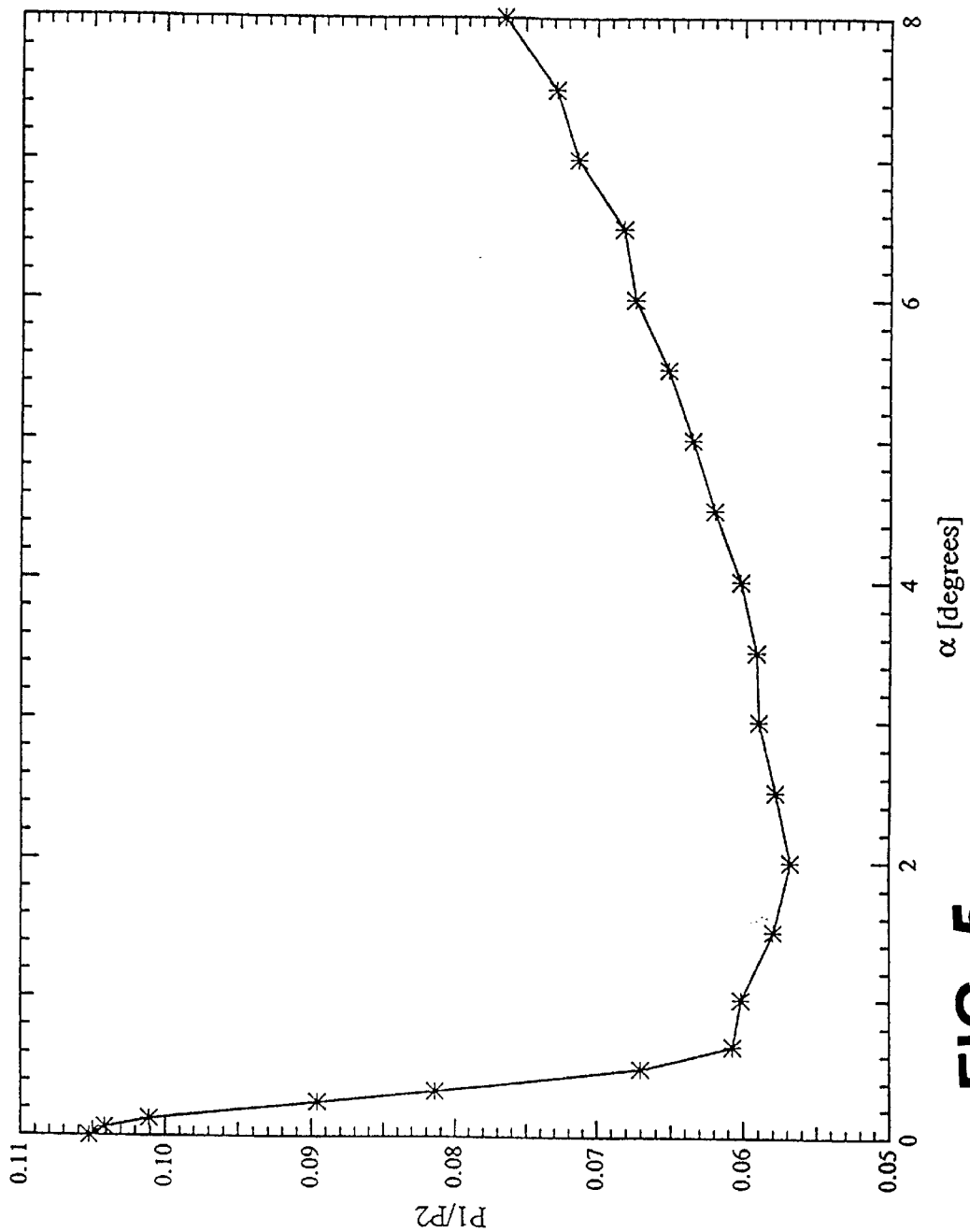
FIG. 5 is a graph of calculated ratio for sensing scheme of FIG. 4 for a single fiber kink as a function of kink angle. P1 is the power carried by the highest mode group, P2 is the power carried by all the remaining modes except for the modes in the highest mode group. Same fiber parameters and calculation method used as in FIG. 3.

The results of all-mode wave optics calculations (32) for this sensing method are shown in FIG. 5. In the figure we plot the ratio of the mode power for the highest mode group to the mode power for the remaining mode groups. For a kink bias of ~0.25 degrees, a monotonic change in the ration is obtained for a variation in kink angle of ~1.5 degrees. The sensitivity of the technique allows the detection of weak perturbations couple to the fiber transducing element due to vibration for example. Strain can also be easily detected for crack detection applications. It should be noted that a kink of 1 degree induces a loss of only 0.43 dB in transmission for this fiber, whereas the MMF grating detection scheme described above provides the potential for much enhanced sensitivity over such simple loss-based measurement systems. For the fiber parameters shown in FIG. 5, the change in signal is almost 3 dB for the situation where the first mode is detected and ratioed with the remaining modes.

In the calculations the mode power distributions for each kink angle were computed for the mean wavelength of the source. Strictly speaking, the effect of the kink on the mode power distributions must be computed for each wavelength and each angle. Additional sensitivity enhancements are expected at the wavelength where the highest modes are near cutoff, since they become extremely sensitive to bend loss near cutoff, however this small fraction of the spectrum of a broadband source. Further investigations of these points for various fiber and source parameters will be reported elsewhere (32).

Figure 6:
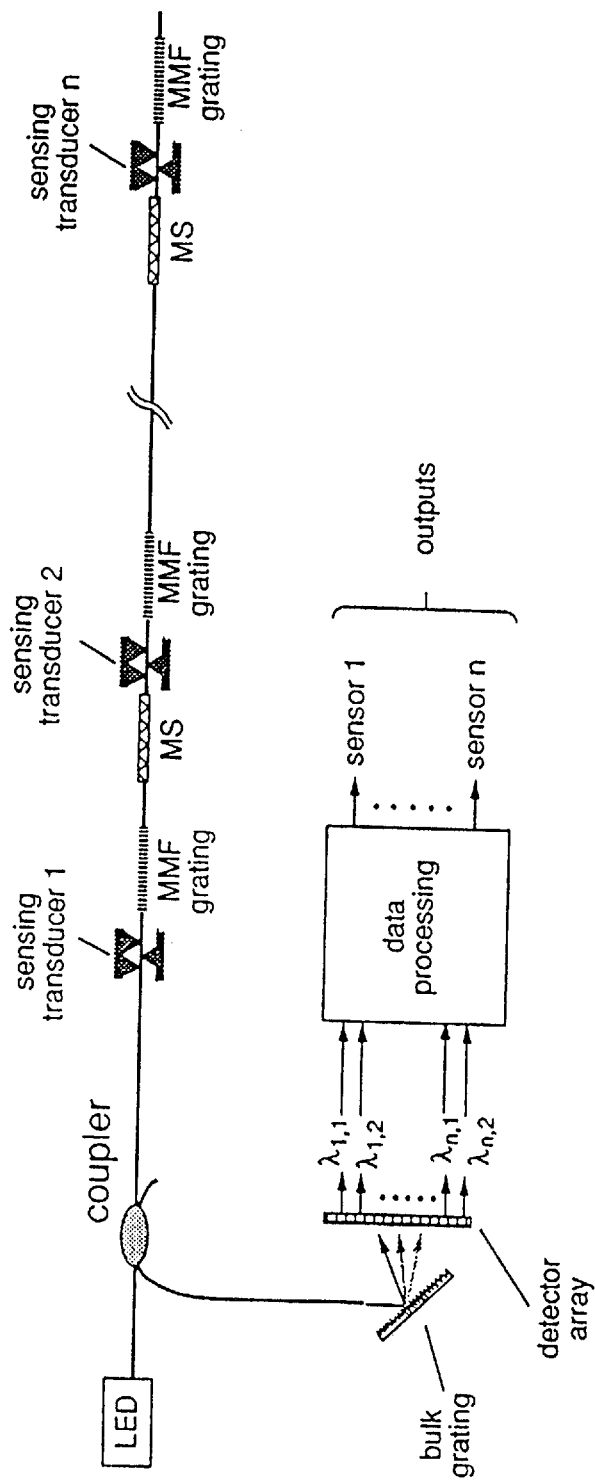
FIG. 6 is a block diagram illustrating the multi-channel, wavelength ratiometric technique for a multiplexed MMF grating array using a bulk grating and detector array wherein mode scramblers (MS) are placed after each sensor to restore the upper mode population and each sensor is encoded by a particular wavelength in this method.

The system can be multiplexed in a serial array using the topology shown in FIG. 6. Here, the light from the source is coupled to a fiber that contains several MMF gratings. Each grating is written with a different periodicity to wavelength-offset their reflection spectra. A sensing transducer is placed prior to each MMF grating. The number of sensors which can be supported with a given source is limited by the MMF grating and source bandwidths. In order to re-equalize the modal power distribution of the light in the fiber prior to each sensing transducer, a mode scrambler (MS) is included. This device could be implemented utilizing a photosensitive based device, such as a modal resonant rocking filter. The outputs from the individual sensors could be detected using a series of optical filters to implement the above ratiometric signal processing technique. Using this approach, a series of 6 to 10 sensors could be addressed along a single fiber using a typical LED source with a bandwidth ~60 to 100 nm, without employing TDR techniques.

Figure 7:
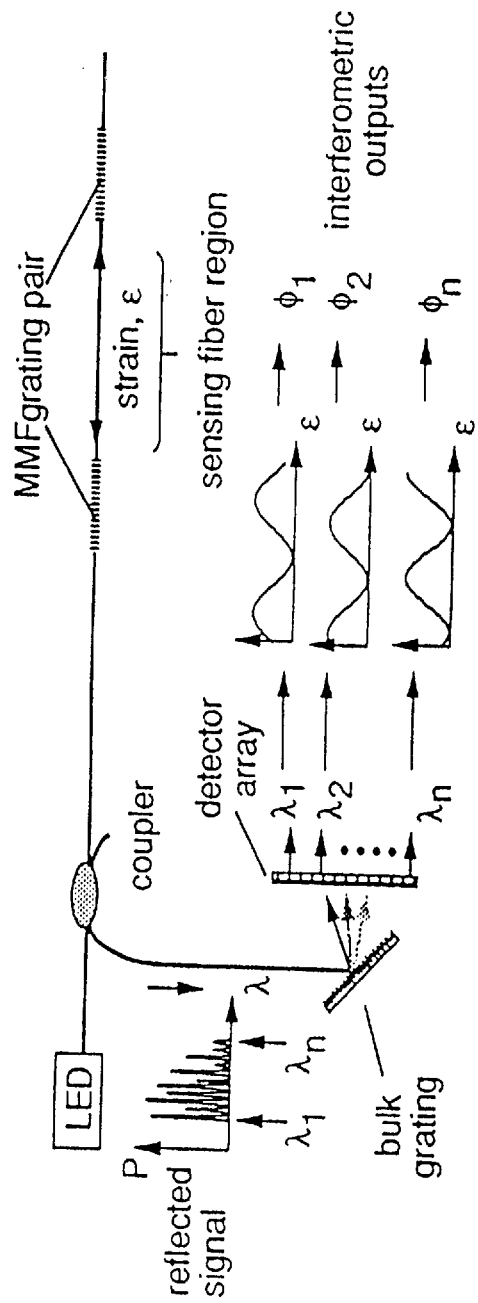
FIG. 7 is a schematic of an MMFBG based in-line fiber interferometer with output wavelength separation of the modal interferometer signals.

An alternative sensing arrangement is shown in FIG. 7. In this case, an in-line fiber interferometer is formed in the MM fiber by using a matched pair of MMFBG. As the different modes supported by the interferometer are wavelength encoded by the different Bragg wavelengths, the interference output corresponding to each mode is separable by wavelength discrimination. It should be noted that this is different to the case when other types of non-dispersive reflectors are used, such as reflective splices for example; for such reflectors, all the interference signals associated with each mode are generated for all wavelengths, and thus the net interference signal obtained is scrambled. However, with the use of independent mode MMFBG, the interference signal associated with each mode can be monitored independently by selective wavelength filtering. This property will allow two or multiple interferometer outputs to be generated with phase quadrature relationships, which aid in the demodulation of interferometric signals. FIG. 7 illustrates the use of a bulk dispersive element and a photodetector array to separate the modal interferometer signals, which then yield a series of n(~20–30) interferometer phase shifts of bias phase $\phi(1)$ through $\phi(n)$.

These approaches for independent mode gratings serve to illustrate the potential for using MMF gratings as sensing devices. There are many other multiplexing topologies that can be used to advantage with MMF Bragg gratings, such as combined serial-parallel systems. It is clear from the foregoing discussion that MMF Bragg gratings can be useful as mode group population sensors, which will be sensitive to microbend induced mode transitions immediately before the grating. This feature should make such gratings a useful diagnostic tool for local mode population studies from connectors, couplers, taps, and other mode distribution disturbing perturbations.

In addition to the mode group shift and enhance reflection sensing mechanisms, the straining of MMF Bragg gratings will produce small wavelength shifts in the peaks of all the mode reflectivities, similar to single mode gratings, due to the strain induced change in length of the grating and the photoelastic index change, thus changing the Bragg condition with strain (2, 3). This would allow wavelength shift techniques which were developed for single mode fiber Bragg gratings to be employed (33), if due care is taken to insure that all the modes from the grating are observed and a broadband source is employed.

MODE COUPLING GRATINGS

By a mode coupling grating, we mean one that has substantial off diagonal coupling matrix elements $D_{c,\mu}(z)$ (including extension of the modal expansion to radiative and cladding modes). In this category of grating, mode coupling/conversion is produced by non-uniform transverse spatial variation of the dielectric or refractive index perturbation associated with the grating. The mode coupling/conversion can be of several types such as 1.) forward bound mode, backward bound mode, 2.) forward bound, backward radiation or cladding, 3.) forward bound, forward bound, and 4.) forward bound, forward radiation or cladding. The converse of these processes are also possible. It is worth noting that a transversely uniform refractive index perturbation does not produce mode coupling, even to radiation modes, due to mode orthogonality.

Very little work has been reported on the transverse spatial properties of grating refractive index perturbations.

Malo et al (10) have reported single excimer pulse photo-induced perturbations that are highly localized on the core-cladding boundary which do not extend across the core of a single mode fiber. These gratings had substantial outcoupling from the core of the fiber for wavelengths shorter than the Bragg wavelength, so called coherent sub-Bragg scattering (9), and function as efficient fiber taps. The high-fluence, phase mask technique used also produced second order Bragg reflections from index perturbations with twice the longitudinal spatial period of the fundamental modulation. Askins et al (9) have discussed various types of transverse spatial distributions of grating perturbations in single mode fibers and classified them by their method of fabrication and transmission characteristics. These authors were primarily concerned with radiative coherent sub-Bragg scattering as a transmission loss problem, and what type of transverse index perturbations can reduce this effect. To our knowledge, there have been no discussions of the effects of transverse non-uniformities in highly multimode fiber Bragg gratings.

There are many possible uses for MMF gratings associated with mode coupling/conversion. Some applications are forward mode scrambling after a microbend region and for mode converters to couple light both into and out of the fiber cores. Multimode fiber Bragg gratings are expected to couple more efficiently to cladding/radiation modes than single mode fibers, due to the larger core size compared to the cladding diameter. This should be especially true for the highest order modes in fibers with a large core/cladding diameter ratio. Sensors based on coupling light out and back into the fiber core, such as certain types of chemical sensors with chemically sensitive molecules embedded in the fiber coating, should be able to utilize this property. Another application is for mode selective reflectors, an application not possible with single mode fiber. For example, one can fabricate gratings that only reflect for the high order mode groups, which are most sensitive to microbending, by noting that index perturbations confined to near the core-cladding boundary will have greatest effect on the higher order modes in a multimode fiber, since the low order modes do not have appreciable power at this distance from the fiber axis. Another case of interest for mode coupling gratings is coupling of incident cladding/radiation modes and mode conversion to backward going bound modes of the core. Radiation loss from upstream microbends could be sensed in this way. By reciprocity, the same matrix elements apply as for the case of forward bound, backward radiation transitions, although the total reflectivity will be different depending on the population of incident bound modes or incident cladding modes. The cladding modes could have been excited by a single kink bend immediately before the grating. Due to the lossy nature of such cladding/radiation modes, such a mode conversion grating should have a very local response to microbends in the immediate vicinity of the grating. Design of such novel sensors will require calculation of cladding/radiation mode excitation after a single kink.

Two examples worth mentioning for producing mode coupling/conversion gratings are asymmetric grating profiles and tilted gratings. Asymmetric profiles will naturally be produced by the strong absorption and focusing that is usually employed in grating fabrication with UV laser light, in conjunction with the cylindrical lens type of effect that occurs when the laser beam enters the fiber. These effects have been shown to depend on laser fluence (9, 10). Clearly there will be transverse intensity gradients in the fiber that will lead to non-uniform transverse refractive index perturbations. Due to large core diameter of multimode fibers compare to single mode fibers, such effects should be quite noticeable and controllable due to the wide range of fiber parameters available with multimode fibers. These effects should be interesting to compare for various core diameter fibers and index profiles, such as graded index vs. step index.

One of the simplest ways to produce mode coupling is to make a tilted fiber Bragg grating. Although tilted gratings are important for coupling to radiation modes when a given mode is beyond its Bragg wavelength, tilted gratings can also produce mode coupling transitions from one forward going bound mode to a different backward traveling bound mode, as well as forward bound-bound mode conversion. As an example, consider the case of a uniform, tilted grating located between z=0 and z=L. The refractive index perturbation can be written as $$n^2(x,y,z) = \bar{n}^2(x,y) + \Delta\epsilon_0 \cos(q_x x + q_z z) \tag{57.}$$

where $q_x = q \sin\phi$, $q_z = q \cos\phi$, $q = 2\pi/\Lambda_g$, where $\Lambda_g$ is the grating period, and $\phi$ is the grating tilt angle measured relative to the fiber axis. This corresponds to writing the photosensitive grating with two uniform plane waves by tilting the fiber an angle of $\phi$ relative to the bisector between the beams, which was originally normal to the fiber axis. For $\phi=0$, equation 57 reduces to the transversely uniform perturbation (equation 36 with f(x, y)=1). Inserting equation 57 into the expression for the mode coupling coefficients equation 6 we obtain $$D_{\alpha\mu}(z) = \frac{-k^2 \Delta\epsilon_o}{N_\alpha} \left[ \begin{array}{l} \cos(q_z z) \int_{A_\infty} d^2 x \cos(q_x x) \phi_\alpha^*(x,y) \phi_\mu(x,y) \\ -\sin(q_z z) \int_{A_\infty} d^2 x \sin(q_x x) \phi_\alpha^*(x,y) \phi_\mu(x,y) \end{array} \right] \tag{58.}$$

where the normalization integral is $$N_\alpha = d^2 x \phi_\alpha^*(x,y) \phi_\alpha(x,y) \tag{59.}$$

Equation 58 clearly shows how the mode coupling enters for a tilted grating. For small tilt angles, the second term produces mode coupling transitions to first order in the tilt angle $\phi$ where the angular mode number 1 must change by one. The first term does not contribute to mode coupling transitions to first order in $\phi$. For larger angles, both terms in equation 58 strongly contribute to mode coupling, and there is no $\Delta l=1$ "selection rule" for mode transitions, so that transitions from low order modes to non-adjacent higher order modes occur.

FIG. 8, comprising FIGS. 8a to 8d, shows end-on views of a fiber core. The hatched areas indicate the transverse profile of the grating index perturbation (f(x,y) in Equations 36 and the outer circle is the core clad boundary. FIG. 8a shows the transverse grating port perturbation confined to near the fiber axis making $\eta_\alpha$ in Equations 38 and 47 large for low order modes and small for higher order modes. This produces selective high reflectivity for low order modes. FIG. 8b shows the grating port perturbation confined to near the core cladding boundary. This type of transverse grating distribution makes $\eta_\alpha$ large for high order modes and very small for low order modes, thus producing selective reflection of high order modes and little or no reflection of low order modes. FIGS. 8c and 8d show angular dependence in the transverse grating refractive index profiles, thus allowing a further angularly selective modal reflectivity—i.e., FIG. 8c has high reflectivity for high order radial modes with specific angular patterns. Additional angular modal selective reflection can be achieved by confining the transverse angular perturbation to other angular segments of the core. FIG. 8d has high reflectivity for low order modes of particular angular variation.

FIG. 9a shows a tilted MMFBG. This can be used for mode conversion as already mentioned. Specifically, forward bound modes can be converted to backward radiation or bound modes to tap light out of the fiber or selectively reflect or couple various modes. By reciprocity, such efficient taps are also an efficient way to couple light into the fiber from external sources, such as light in the cladding or coating. FIGS. 9b and 9c show tilted gratings with transverse perturbations confined to the region near the fiber axis in FIG. 9b and near the core clad boundary in FIG. 9c, respectively. In FIG. 9b the outcoupling is from low order bound modes to backward higher order modes (bound and/or radiative). In a similar fashion, this type of grating profile distribution will selectively couple light from outside the fiber to lower order bound modes inside the fiber. In FIG. 9c, the outcoupling is from higher order bound modes to radiative modes or light can be selectively coupled from outside the fiber to higher order bound modes of the fiber. Additional applications and modifications of these basic principles allow for various types of fiber mode converters and side input/output couplers to be fabricated. Longer period devices can be used for selective forward mode scramblers and converters.

CONCLUSION

A new class of sensors using fiber gratings based on multimode fibers has been presented. A few exemplary applications and methods for addressing sensors based on these gratings, in particular, strain sensors employing time domain reflectometry techniques have been disclosed. Such MMF Bragg gratings offer local determination of the fiber mode population distribution for the first time, resulting in novel and unique fiber devices and sensing and diagnostic methods. Independent mode gratings were studied in detail and results presented for transversely uniform gratings. Additional possibilities for transversely non-uniform, independent mode and mode-coupling gratings have been described. It is expected that new classes of fiber sensors and devices will result from the implementation of the invention presented here. The present invention is not necessarily limited to the use of periodic gratings. For example, "chirped" grating configurations in multi-mode fiber may also be useful for their unique properties in regard to smoothing and broadening of spectral response.

Having thus described a number of exemplary embodiments by way of illustration only and it being understood that the scope of protection afforded hereby is not necessarily limited to the disclosed embodiments, but only by the scope of the appended claims and their equivalents,

I claim:

1. An apparatus for sensing the mechanical disturbance of an optical fiber comprising a length of multi-mode optical fiber having a Bragg grating at a selected location in said fiber for reflecting light within a selected plurality of contiguous bandwidths;

a source of light having emission within said selected plurality of bandwidths, said source being optically coupled to said fiber at an end thereof for transmitting said light into said fiber;

an optical coupler coupled to said fiber between said source and said grating for directing light reflected from said grating to a location external of said fiber;

at least two optical detectors positioned for receiving light from said optical coupler;

a filter for directing light in at least one of said selected plurality of bandwidths to a first one of said detectors and for directing light in at least one other of said selected plurality of bandwidths to a second one of said detectors;

a comparator for comparing the respective magnitudes of light detected by said first and second detectors, respectively, and generating an output proportional to the ratio of said magnitudes, said ratio being a function of the mechanical disturbance of said fiber, and a device for indicating said output.

2. The apparatus recited in claim 1 wherein said filter is a bandpass filter for transmitting light within a selected first bandwidth and for reflecting light not within said selected first bandwidth.

3. The apparatus recited in claim 1 wherein said source of light is a light emitting diode.

4. The apparatus recited in claim 1 further comprising a transducer for inducing a bending of said fiber.

5. An apparatus for using the bending of an optical fiber for sensing a parameter, comprising:

a length of multi-mode optical fiber having a Bragg grating at a selected location in said fiber for reflecting light within a selected plurality of contiguous bandwidths;

a source of broadband light optically coupled to said fiber for transmitting light in at least two of said bandwidths;

a plurality of detectors coupled to said fiber for measuring the respective power of reflected light in at least said two bandwidths;

a comparator for determining the relative light power in said at least two bandwidths in accordance with bending imparted to said fiber, said comparator generating an output dependent on said relative light power;

an indicator for generating an observable manifestation of said output for measuring said bending; and further comprising a filter for directing reflected light in at least one said bandwidth to a first corresponding detector and for directing reflected light in at least another said bandwidth to a second corresponding detector.

6. An apparatus for using the bending of an optical fiber for sensing a parameter, comprising:

a length of multi-mode optical fiber having a Bragg grating at a selected location in said fiber for reflecting light within a selected plurality of contiguous bandwidths;

a source of broadband light optically coupled to said fiber for transmitting light in at least two of said bandwidths;

a plurality of detectors coupled to said fiber for measuring the respective power of reflected light in at least said two bandwidths;

a comparator for determining the relative light power in said at least two bandwidths in accordance with bending imparted to said fiber, said comparator generating an output dependent on said relative light power;

an indicator for generating an observable manifestation of said output for measuring said bending; and further comprising means for determining a shift in the frequency of a peak reflected light magnitude resulting from the bending of said optical fiber.

7. A sensing apparatus comprising a length of multi-mode optical fiber having a spaced, serial array of Bragg gratings, each such grating configured for reflecting light over a different bandwidth;

a mode scrambler for each such grating beyond the first grating of said array for re-equalizing modal power distribution;

a source of broadband light coupled to said fiber;

an optical coupler coupled to said fiber for redirecting light reflected by said gratings;

a plurality of detectors, each such detector configured for receiving light within a selected bandwidth from said optical coupler for determining the modal reflected power distribution for each such grating; and means for indicating the respective modal reflected power distribution of said detectors.

8. The apparatus recited in claim 7 further comprising a bulk grating positioned between said optical coupler and said detectors for separating said redirected reflected light by respective wavelengths.

9. The apparatus recited in claim 7 wherein said source of broadband light is a light emitting diode.

10. The apparatus recited in claim 7 comprising a plurality of fiber bending transducers, at least one such transducer being associated with each said Bragg grating for inducing a bending of said fiber.

11. A method for sensing the strain of an optical fiber; the method comprising the steps of:

a) treating a multi-mode optical fiber to provide at least a pair of spaced-apart Bragg gratings to form an interferometric pattern of reflected light to detect phase-shifts in said optical fiber between said gratings;

b) coupling a broadband light source into the fiber;

c) determining the phase of the reflected light pattern in each of a plurality of bandwidths;

d) comparing the phase of the measured light patterns in at least two such bandwidths as a function of fiber strain; and e) generating an indication of the relative phases of measured light patterns in said at least two bandwidths.

12. A sensor comprising:

a multimode optical fiber having at least one Bragg grating formed therein;

a broadband source of light coupled to said fiber;

at least one bandwidth limited detector for detecting reflected modal power in said fiber, whereby changes in modal power distribution within the bandwidth of said detector indicate a sensed parameter; and means for indicating the detected reflected modal power in said fiber for measuring said sensed parameter.

13. The sensor recited in claim 12 wherein said detector is wavelength dependent.

* * * * *